United States Patent
Yang et al.

(10) Patent No.: US 8,175,092 B2
(45) Date of Patent: May 8, 2012

(54) ADDRESS PROTOCOL RESOLUTION OF ROUTER DEVICE

(75) Inventors: Lei Yang, Suzhou (CN); Ruoyo Cao, Suzhou (CN)

(73) Assignee: Sercomm Corporation, Taipei (TW)

( * ) Notice: Subject to any disclaimer, the term of this patent is extended or adjusted under 35 U.S.C. 154(b) by 229 days.

(21) Appl. No.: 12/483,929

(22) Filed: Jun. 12, 2009

(65) Prior Publication Data

US 2009/0316710 A1    Dec. 24, 2009

(30) Foreign Application Priority Data

Jun. 13, 2008    (CN) .......................... 2008 1 0111094

(51) Int. Cl.
*H04L 12/28* (2006.01)
*H04L 12/56* (2006.01)

(52) U.S. Cl. ........................................ 370/389; 370/401

(58) Field of Classification Search ........................ None
See application file for complete search history.

(56) References Cited

U.S. PATENT DOCUMENTS

| 2003/0033418 | A1* | 2/2003 | Young et al. | 709/230 |
| 2004/0103314 | A1* | 5/2004 | Liston | 713/201 |
| 2004/0249975 | A1* | 12/2004 | Tuck et al. | 709/245 |
| 2005/0015510 | A1* | 1/2005 | Rhee | 709/238 |

* cited by examiner

*Primary Examiner* — Chirag Shah
*Assistant Examiner* — Minh-Trang Nguyen
(74) *Attorney, Agent, or Firm* — Thomas|Kayden

(57) ABSTRACT

An address resolution protocol method of a router device comprising steps of: (a) Proving an Internet domain to connect a plurality of computers and a router device. (b) Accepting an address resolution protocol due to the router device, and the address resolution protocol has a sender Internet protocol address (SIPA) and a target Internet protocol address (TIPA). (c) Comparing the SIPA to have the internal domain. (d) Sending to an Internet resolution protocol (IRP) within the Domain Name of Internet network, and to send the IRP to compare with the internal control protocol address. (e) Corresponding with the SIPA of the internet address; renewing the one of the data of the location of the address due to the router device; the SIPA not to correspond with the data of the internet address; the router device to save the SIPA.

8 Claims, 7 Drawing Sheets

| Internet address protocol column | media access control address column | saving time address column | relative internet protocol address column | reserve column |
|---|---|---|---|---|
| 192.168.100.1 | 0:C0:02:DD:D4:22 | 60 | WAN | 1 |
| 192.168.100.3 | 00:0F:EA:0A:9B:6E | 60 | WAN | 1 |
| 192.168.100.4 | 00:12:3F:27:AD:74 | 60 | WAN | 1 |
| 0.0.0.0 | 00:00:00:00:00:00 | 60 | LAN | 0 |
| ... | ... | ... | ... | ... |

FIG.3

ADDRESS PROTOCOL RESOLUTION OF ROUTER DEVICE

BACKGROUND OF INVENTION

1. Field of the Invention

The present invention relates to transfer Internet address of a router device and an acting method of address resolution protocol.

2. Description of the Prior Art

FIG. 1 is a structural diagram of a Local Area Network and a Wide Area Network. The Local Area Network 11 connects with the computers 111, and the Wide Area Network 12 computers 121, and also the Internet 14 and the exterior computer 13 changes for the information.

A router device 10 of the network address translation (NAT)-enabled connects the Local Area Network 11 and the Wide Area Network 12 respectively. The Local Area Network 11 computer 111 sets the dynamic host configuration protocol method to connect the router device 10 through a dynamic host configuration protocol method of the router device 10 for updating the Local Area Network 11 computer 111 of the internet protocol address. The Local Area Network 11 computer 111 and the Wide Area Network 12 computer 121 exchange the data with the Internet 14 and the exterior computer 13.

The Local Area Network 11 computer 111 sets the static internet protocol address method connects to the router device, it needs to improve the Wide Area Network 11 computer for setting internet protocol address and connecting the internet 14 or the Wide internet 12 computer 121 for exchanging the data. So, it increases the cost of the Internet and the complicated defects.

The computer sets the Internet protocol address method for the different servers and providing different services (such as the email receives or files translation). The Internet protocol address is set the computer by manual correction. It must tell the customer or correct the customer software setting. The customer continues to use different services from the computer. Also, after the manual correctional Internet protocol address, the router device 10 corrects the firewall facilities correspondingly. The customer point connecters with the remote point to the Local Area Network 11. This problem is urgent to find out the solution.

SUMMARY OF INVENTION

It is therefore one objective of the present invention to provide an apparatus and method for the address protocol of the router device. The method of the address protocol replaces the router device. The numbers of the connecter of the router device of the computer do not exchange effect by manual correction.

The above-mentioned propose, the present invention to provide a method for the address resolution protocol of the router device. A method for an address resolution protocol of a router device comprising steps of:

Step (a) Prove an Internet domain to connect a plurality of computers and a router device, the Internet domain has a Local Area Network and a Wide Area Network, each computer has a Network Address Translation corresponsively, the router device has a connecter of the Local Area Network, an interconnect of the Wide Area Network and a Network Address Translation. The Network Address Translation saves the data of the Internet address. The Network Address Translation to have some the data of the location of the address.

Step (b) Accept an address resolution protocol due to the router device, and an address resolution protocol has a sender internet protocol address and a target Internet protocol address.

Step (c) Compare the above-mentioned of the transmission control protocol address whether located in the Internet domain.

Step (d) The above-mentioned of sending to the Internet resolution protocol within the Domain Name of internet network, and to send the Internet resolution protocol to compare with the internet control protocol address.

Step (e) The above-mentioned of corresponding with the sender internet protocol address and the data of the internet address; renewing the one of the data of the location of the address due to the router device; the sender internet protocol address not to correspond with the data of the internet address; the router device to save the sender internet protocol address.

The present invention provides an apparatus for the address protocol of the router device, comprising advantages of:

1. Correct to the Internet connection of the computer of the Local Area Network without manual correction, the network address translation unit of the router device exchanges the data to the computer of the Wide Area Network.
2. Transform to the Internet address of the router device without manual correction to correct the Internet connection of the computer of the Local Area Network for entering the Internet.
3. Transform to the Internet address of the router device without manual correction to correct the Internet connection of the computer of the Local Area Network for mending the firewall equipment for the customers through the Internet computer connects with an internet remote point.

BRIEF DESCRIPTION OF THE DRAWINGS

FIG. 3 is a block diagram of the address transformation unit according to preferred embodiment of the present invention.

DETAILED DESCRIPTION

Figure 1:
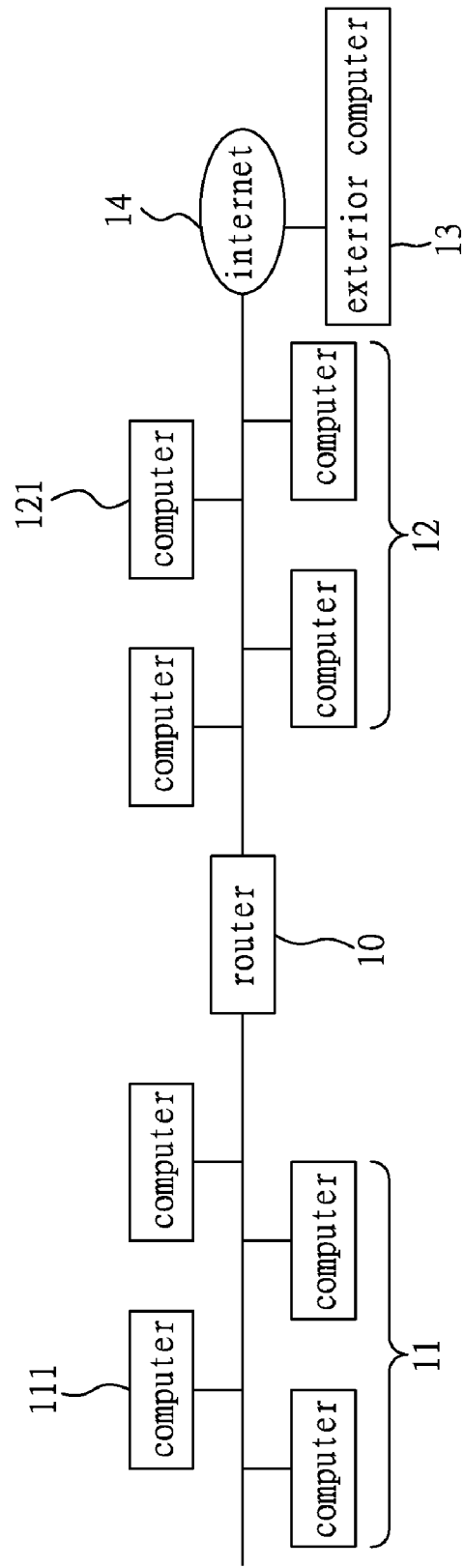
FIG. 1 is a structural diagram of a Local Area Network and a Wide Area Network.
Figure 2:
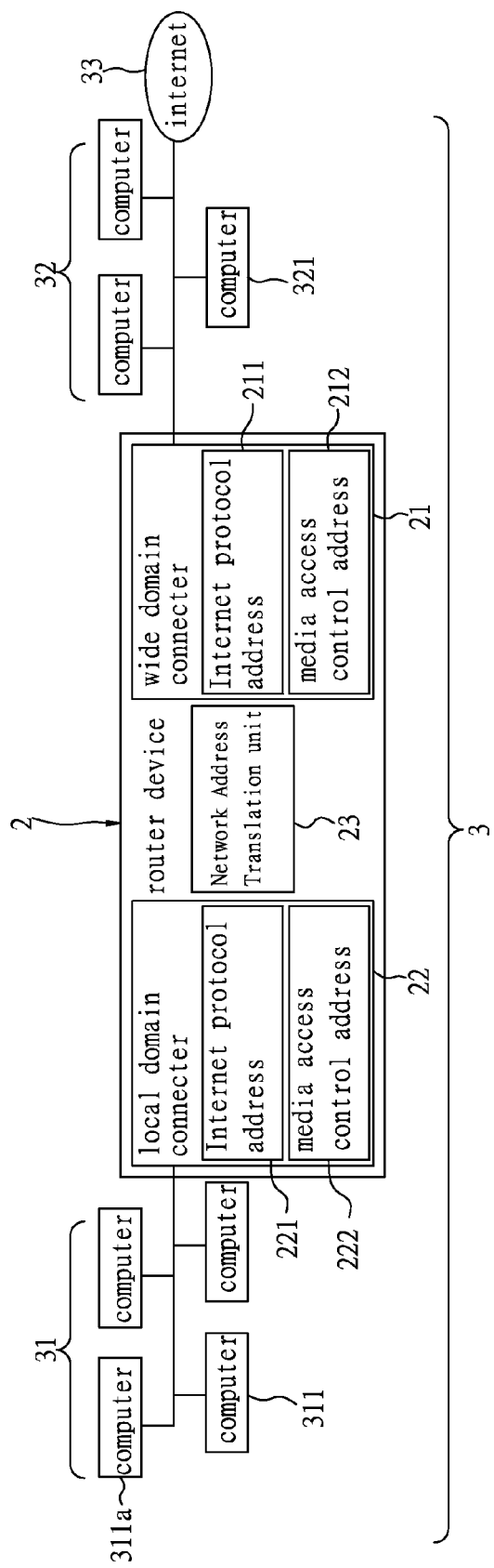
FIG. 2 is a block diagram of the transfer internet address of a router device for connecting with the Local Area Network, the Wide Area Network and the address transformation unit.

FIG. 2 and FIG. 3 are block diagrams of the transfer internet address of a router device for connecting with the Local Area Network, the Wide Area Network and the address transformation unit according to an embodiment of the present invention. The present invention comprises an Internet network 3 connects the plurality of computers 311, 321 with each other. The Internet domain 3 divides a Local Area Network 31 and a Wide Area Network 32. Each computer 311, 321 has an Internet address data correspondingly (non-shown). The transfer Internet address of the router device 2 comprises a Local Area Network, (LAN) 22, a Wide Area Network (WAN) 21 and a Network Address Translation unit 23. The Wide Area Network 21 is inside the router device 2 to provide the connection of the computer 321 of the Wide Area Network (WAN) about the computer 321 such as the personal computer, the notebook, the server or the printer equipment.

The Network Address Translation unit 23 is inside the router device 2 for saving the plurality of computers 311,321 the Internet data. The Network Address Translation unit 23 has address data columns, such as an Internet address protocol column 232, a saving time address column 233, a relative Internet protocol address column 234 and a preserve column 235. The position of the relative Internet protocol column 234 is the Local Area Network, (LAN) 22, the Wide Area Network (WAN) 21.

The router device 2 has the internet domain 3 according to the present invention, the router device 2 has the Local Area Network 22 connects with the Local Network 31 and the Wide Area Network 22 connects with the Wide Network 32. The router device is according to the Network Address Translation unit 23 to process a special router movement for the computer 311 of the Wide Network 31 without manual correction to correct the Internet connection setting by exchanging data. Wherein, the Internet domain 3 is a 192.168.100X of the Internet domain. One of a computer 311a of the Local Network 31 is a fixed Internet protocol address way to connect with an Internet network 33.

Figure 4:
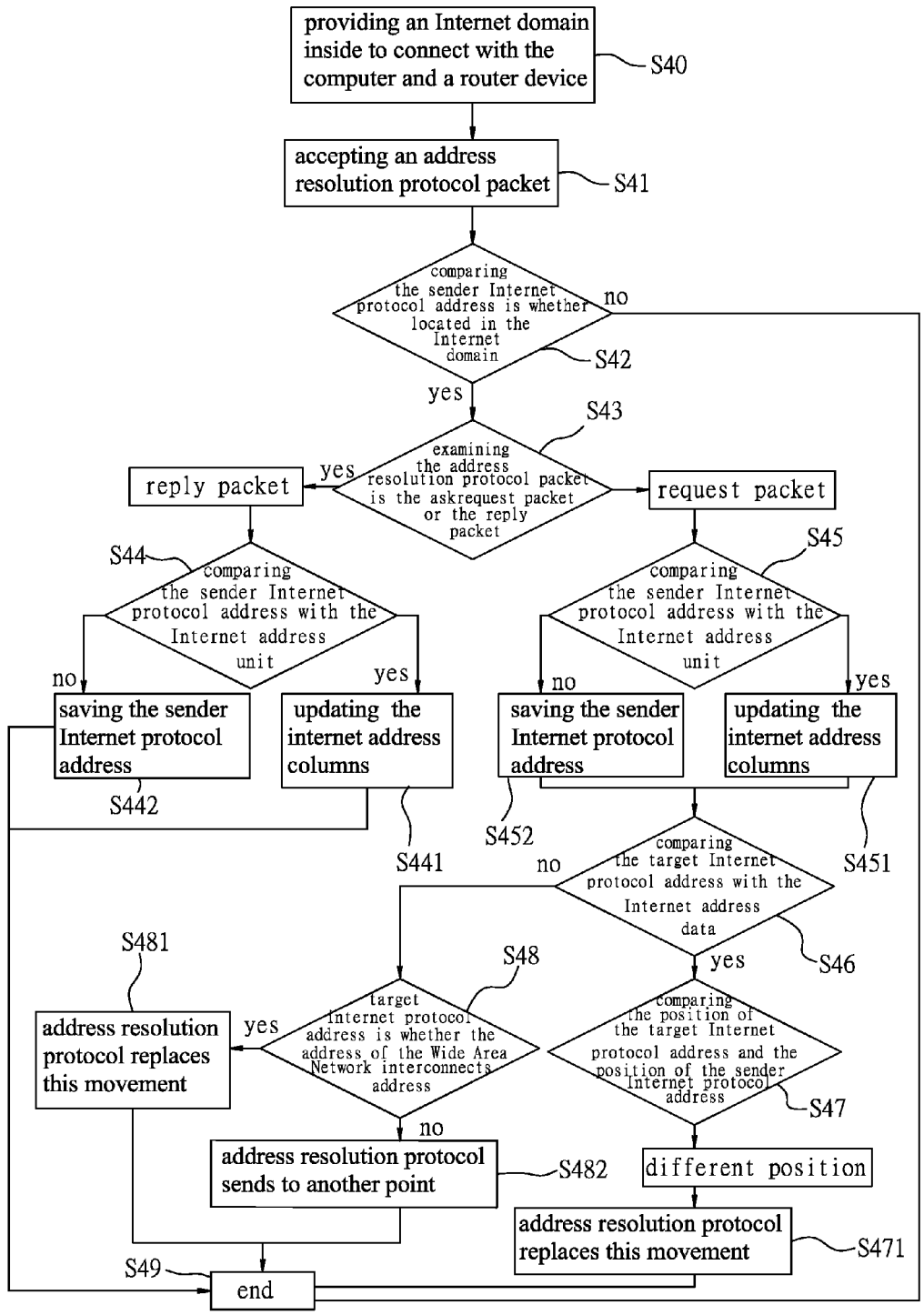
FIG. 4 illustrates that flow diagram of the Internet domain 3 according to the present invention for a preferred embodiment.
Figure 5:
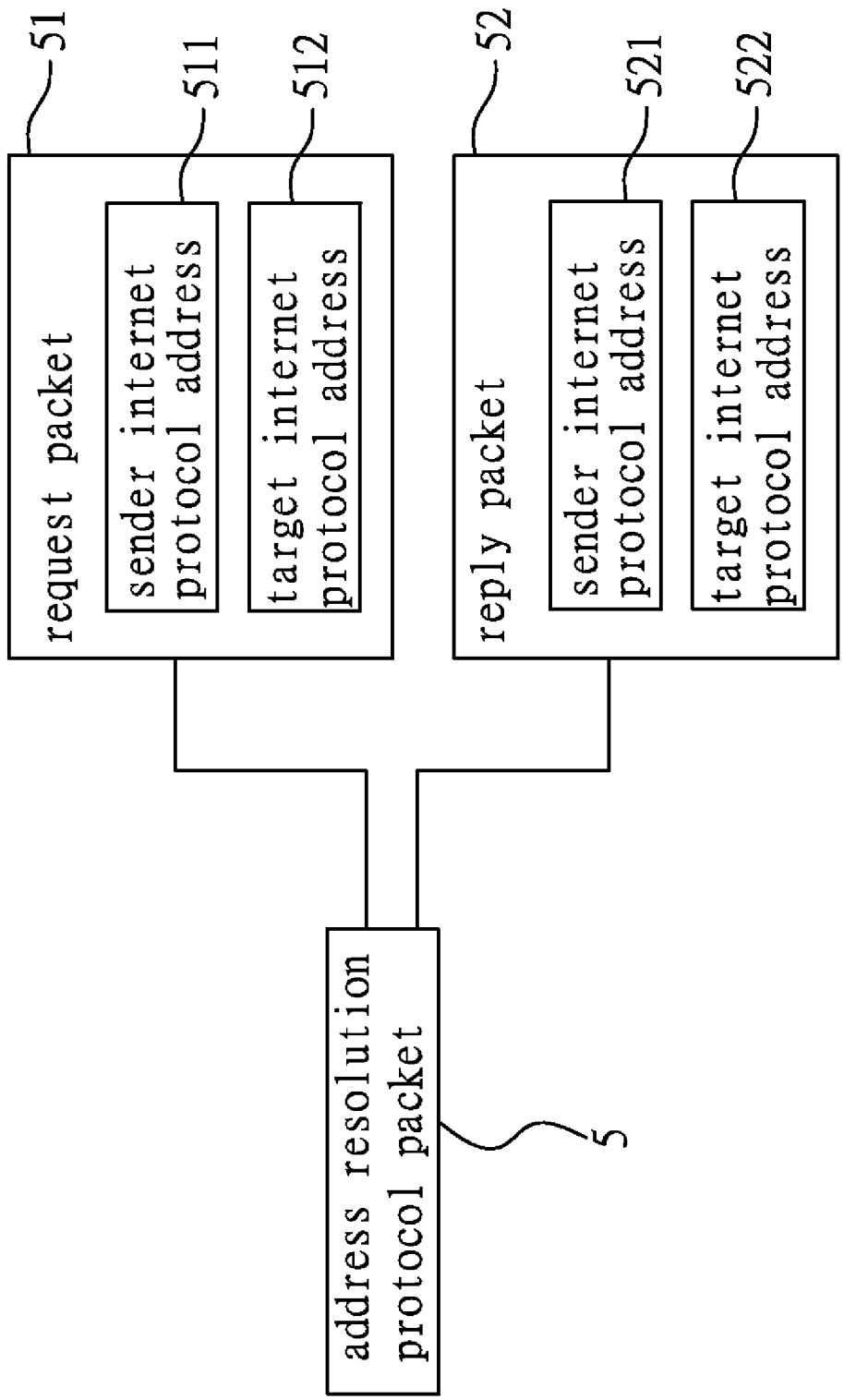
FIG. 5 shows the diagram of the address resolution protocol packet to ask the packet or to reply the packet.

FIG. 4 and FIG. 5 are flow diagrams of the Internet domain 3 according to the present invention for a preferred embodiment, wherein the diagram of the address resolution protocol packet to ask the packet or to reply the packet. The address resolution protocol method according to the present invention for a preferred embodiment, comprises steps of:

S40: provide an Internet domain inside to connect with the computer and a router device.

The Internet domain has a Local Area Network and a Wide Area Network; each computer has an Internet address data corresponsively. The router device has a Wide Area Network connection, a Local Area Network connection and a Network Address Translation unit 23. The Network Address Translation unit saves the Internet address data; the transfer Internet address has a plurality of columns of address data.

S41: the router device accepts an address resolution protocol packet.

Wherein, the computer examines the Internet address to send an address resolution protocol (ARP) packet 5 to the Local Area Network 31 or the wild area network 32. The router device 2 accepts the local area connection 22 or the wild domain connection 21. The address resolution protocol (ARP) packet 5 is a ask packet 51. Another computer accept the ask packet 51 to send the address resolution protocol (ARP) packet 5 to examine the Internet address computer. The address resolution protocol (ARP) packet 5 is a reply packet 52. Whenever the ask packet 51 or the reply packet 52 has a sender Internet protocol address 511,521 and a target Internet protocol address 512, 522.

S42: compare the sender Internet protocol address whether located in the Internet domain 3 (192.168.100.X), if right, the process of Step S43 and if not, the process of Step S49.

S43: examine the address resolution protocol packet is the ask packet or the reply packet, if right, the process of the reply packet is Step S44, if not, the process of the ask packet is Step S45.

S44: compare the sender Internet protocol address with the Internet address unit, if right, the process of Step S441, if not, the process of Step S442.

The router device 2 examines the address resolution protocol is the reply packet 52, the reply packet 52 is the sender internet protocol address 521 and the Network Address Translation unit 23 to compare with the Internet address columns 231.

S441: the router device updates at least one of the Internet address columns.

An Internet protocol columns 231, inter medium control address columns 232, a saving time address columns, an Internet protocol address 234 and a reserve columns 235 are according to a preferred embodiment of the present invention.

S442: The router device saves the sender Internet protocol address.

The router device 2 is according to the data of the address resolution protocol (ARP) packet 5, the sender Internet protocol address data of the Network Address Translation unit 23 to be a new address columns data or a new row Internet protocol address columns 231, the medium interview control address columns 232, the saving time address columns 233, the internet address columns corresponsively 234 and the reverse columns 235.

S45: The sender Internet protocol address compares with the Network Address Translation unit, if right, the process of Step S451, if not, the process of Step S452.

The router device 2 is each the ask packet 51 of the sender Internet protocol address 511 and to compare the Network Address Translation unit 23 with the Internet protocol address columns 231.

S451: the router device updates at least one of the Internet address columns.

S452: the router device saves the sender Internet protocol address.

The router device 2 is according to the data of the address resolution protocol (ARP) packet 5. The sender Internet protocol address of the Network Address Translation unit 23 is a new address columns data or a new row Internet protocol address columns 231, the medium interview control address columns 232, the saving time address columns 233, the Internet address columns corresponsively 234 and the reverse columns 235.

S46: compare the target Internet protocol address with the Internet address data, if right, the process of Step S47, if not, the process of Step S48.

When the ask packet 51 compares with the sender Internet protocol address 511, the router device 2 examines the ask packet 51 of the target Internet protocol address 512 and the movement of the Network Address Translation unit 23 for a compare result.

S47: compare the position of the target Internet protocol address and the position of the sender Internet protocol address, if different position to process of Step S471.

S471: An address resolution protocol replaces this movement.

S48: The target Internet protocol address is whether the address of the Wide Area Network interconnects address, if right the process of Step S481, if not the process of Step S482.

S481: An address resolution protocol replaces this movement.

S482: the address resolution protocol sends to another point, the address resolution protocol packet sends to the local area interconnect.

S49: end.

Figure 6:
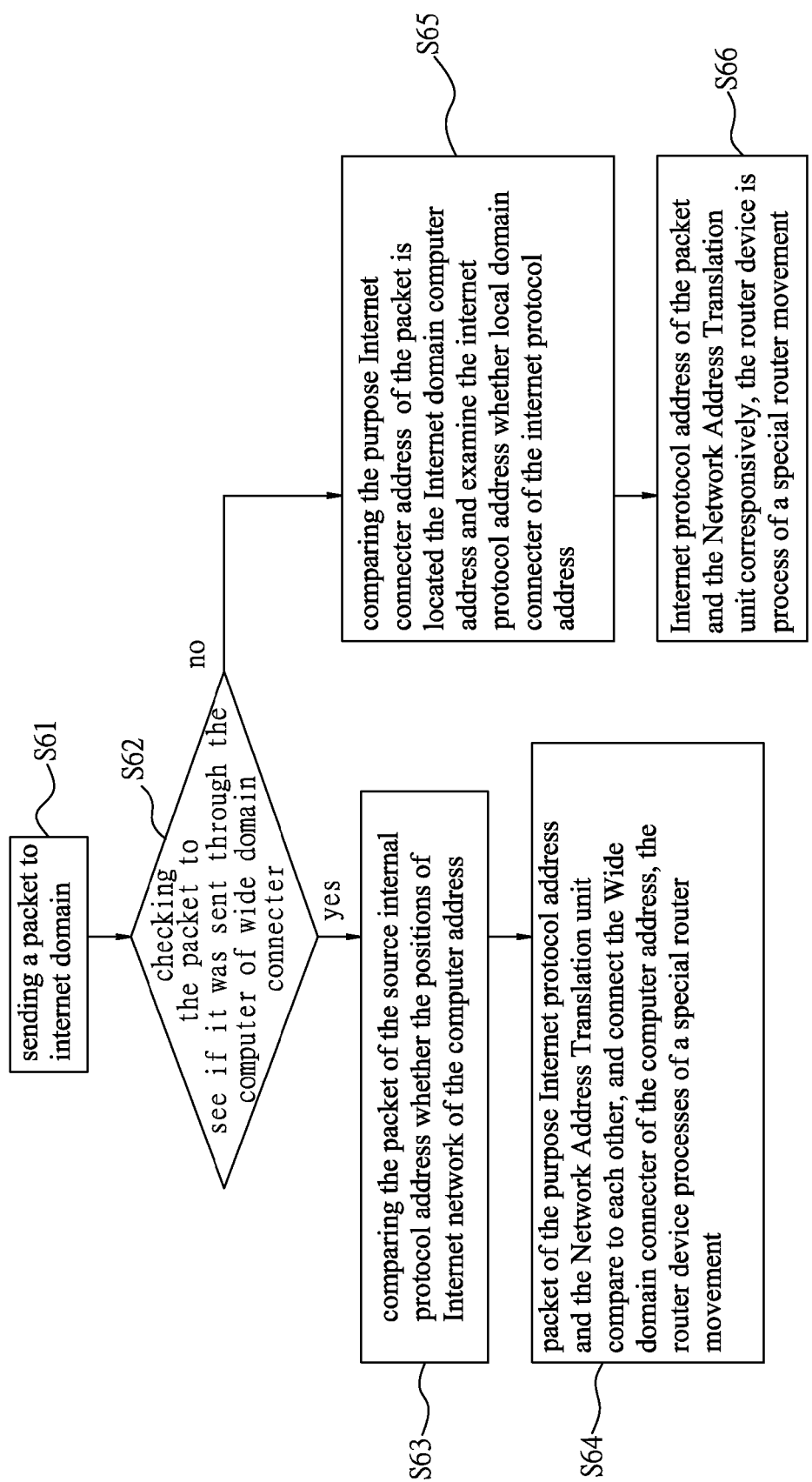
FIG. 6 shows a flow chart of the router device provides the plurality of computers to exchange the method.
Figure 7:
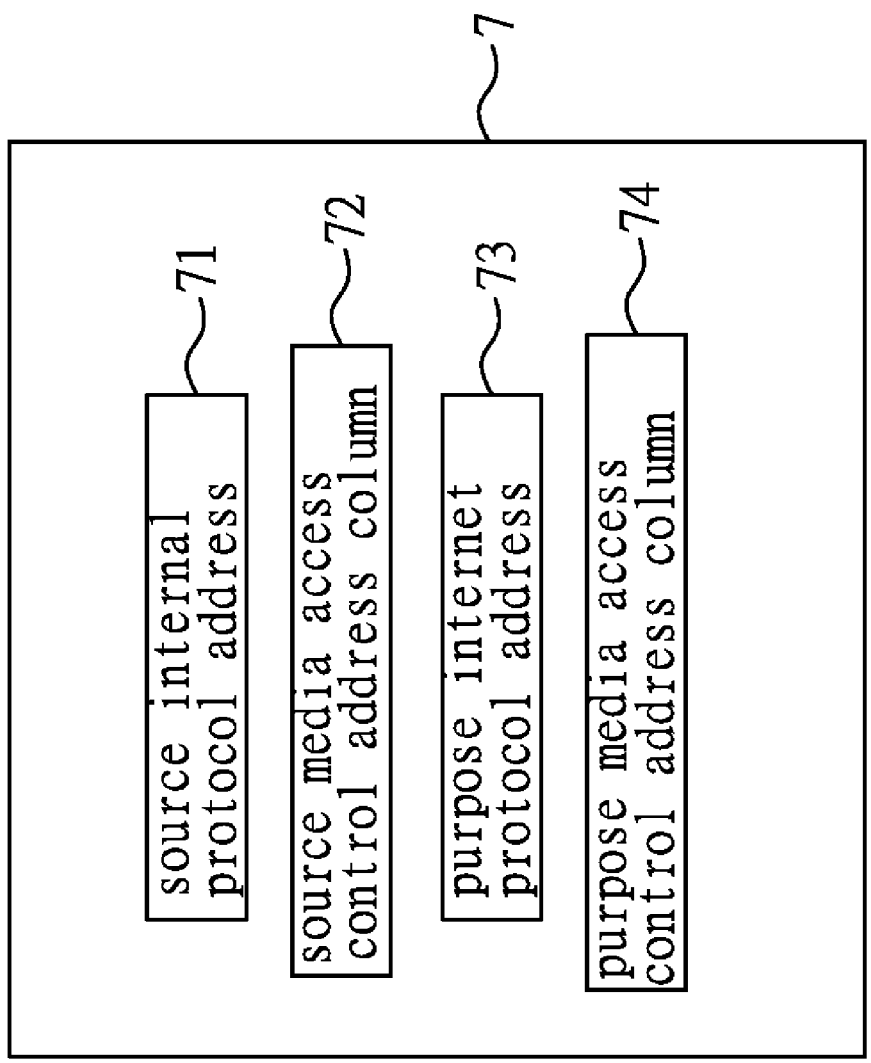
FIG. 7 shows a diagram of the packet is according to the preferred embodiment of the present invention.

FIG. 6 and FIG. 7 is a block diagram of the router device provides a plurality of computers to exchange the method flow chart and the packet is according to the preferred embodiment of the present invention. FIG. 2 illustrates that router device 2 has the Wide Area Network connecter point 21, the Local Area Network connecter point 22 and the Network Address Translation unit 23. The Local Area connecter point 22 has an Internet protocol address 221 and a medium interview control address 222; the Wide Area Network connecter point 21 has an Internet protocol address 211 and a medium interview control address 212.

The present invention is that the router device provides a plurality of computers to exchange the data method, comprises steps of:

S61: when a computer and another computer exchange the data to send a packet 7 to Internet domain. The packet 7 has a source internal protocol address 71, a source medium interview control address 72, a purpose Internet protocol address 73, and a purpose medium interview control address 74, and the packet 7 is an Ethernet packet.

S62: check the packet 7 to see if it was sent through the computer of wide domain connecter movement. If right, the process of Step S63, if not, the process of Step S65.

S63: compare the packet 7 of the source internal protocol address 71 whether the positions of Internet network 3 (i.e. 192.168.100.X) of the computer address.

S64: when the packet 7 of the purpose Internet protocol address 73 and the Network Address Translation unit 23 compare to each other, the router device 2 examines the packet 7 of the purpose internet protocol address 73 to connect the Wide Area Network connect point 21 of the computer address, the router device 2 processes of a special router movement.

Wherein, the special movement divides the three parts (FIG. 2):
1. Change a number of the purpose interview control address 74 columns of the packet 7 and the number of the Internet protocol address 73 corresponsively.
2. Change the purpose interview control address of the packet 7, the router device 2 of the medium interview control address 212 of the wide Internet connecter point 21.
3. Change the packet 7 sends to connect the wide network connects point 21 computers.

S65: compare the purpose Internet connects point address 71 of the packet 7 is located the Internet domain 3 computer address and examine the internet protocol address 73 whether the local network connect point 22 of the internet protocol address 221.

S66: when the Internet protocol address of the packet 7 and the Network Address Translation unit 23 corresponsively, the router device 2 is process of a special router movement.

Wherein, the special movement has three parts (FIG. 2):
1. Change a number of the purpose interview control address 74 columns of the packet 7 and the number of the Internet protocol address 73 corresponsively.
2. Change the purpose interview control address of the packet 7, the router device 2 of the medium interview control address 222 of the wide Internet connecter point 22.
3. Change the packet 7 sends to connect the wide network connecter point 22 computers.

When the Local Area computer 311 connects a Internet 33 to send a ask packet 51 to ask the position of the gateway, the Local Area Network connects point 22 of the router device 2 accepts the ask packets 51. The router device 2 is process of an address resolution protocol replace movement. The Local Area Network computer 311 sends the packet from the local Internet domain 31 to the Wide Area Network 32.

When a computer 311a with the Local Area Network 31 through the router device 2 is an Internet protocol address (non-shown). The Internet protocol address of the computer 311a is the same with the Local Area Network connect point 22 of the router device 2. The computer 311a connects with different place of the Local Area Network 31 and the Wide Area Network 32. The computer 311a has the router device 2 is process of a special router device movement for exchanging the data. Wherein, the computer 311a is local the Internet domain to be the Internet domain of 192.168.2.X.

The above mentioned, the present invention relates to the Network Address Translation unit of a router device with a plurality of computers connects to the internet domain 3, the internet domain 3 divides the Local Area Network 31 and the Wide Area Network 32. The router device 2 is through the Network Address Translation unit 23 is process of a special router movement to local the Local Area Network 31. A fixed Internet protocol address method connects to the Local Area Network 31 computer without manual correction setting. The computer of the Wide Area Network 32 computer exchanges the data for connecting Internet 33.

The Local Area Network 31 is that the fixed Internet protocol address method connects the Local Area Network 31 computer. The router device 2 does not have a firewall correction setting to provide a customer computer from the remote point to Local Area Network 31 computer. The router device 2 with the Internet 3 is through the computer hardware. The computer or the router device 2 is through any computer software. Therefore, when the internet operation achieves the purpose of the plug according to the present invention.

While the present invention has been shown and described with reference to the preferred embodiments thereof and in terms of the illustrative drawings, it should not be considered as limited thereby. Various possible modifications and alterations could be conceived of by persons skilled without departing from the scope and the spirit of the present invention.

What is claimed is:

1. A method for executing address resolution operation, the method comprising:
   (a) providing a network domain, comprising at least two interconnected computers, a router device, a local area network (LAN), and a wide area network (WAN), the at least two computers having respective network addresses, the router device having a network address translation unit, wherein the network address translation unit further having at least an address field datum and the router device comprises a connector for WAN;
   (b) receiving an address resolution packet, which includes a sender IP address and a target IP address, by the router device, wherein the address resolution packet is provided by one of the at least two interconnected computers to the router device through the LAN or the WAN;
   (c) determining whether the sender IP address is within the network domain; if not, the method proceeds to an end;
   (d) when the sender IP address is within the network domain, comparing the sender IP address with the network addresses;
   (e) when the sender IP address is compared as corresponding to the network addresses, updating the at least one address field datum by the router device; and
   (f) when the sender IP address is compared as not corresponding to the network addresses, storing the sender IP address by the router devices, wherein, after step (d), the method further comprises:
   (g) comparing the target IP address with the at least an address field datum;
   (h) when the target IP address corresponds to the at least an address field datum, comparing the target IP address with the sender IP address, wherein when the target IP address and the at least an address field datum do not correspond to each other, comparing the target IP address with an address of the connector for WAN.

2. The method of claim 1, wherein after step (h), the method further comprises:
(i) comparing the target IP address with the sender IP address, wherein,
the router device executes address resolution operation when the target Ip address and the sender IP address do not correspond to each other.

3. The method of claim 1, wherein the router device further comprises a connector for LAN and after step (h) the method further comprises:
(j) when the target IP address corresponds to the address of the connector for WAN, the router device executes address resolution operation;
(k) when the target IP address does not correspond to the address of the connector for WAN, transmitting the address resolution packet to the connector for LAN.

4. The method of claim 1, wherein the network domain further comprises a LAN and a WAN, the address resolution packet is provided by one of the at least two interconnected computers and transmitted to a third computer, a returned address resolution packet is sent back to the computer previously providing the address resolution packet by the third computer, and the returned address resolution packet is transmitted to the router device through the LAN or the WAN.

5. The method of claim 1, wherein the router device comprises a connector for LAN and a connector for WAN, which respectively have an IP address and a medium access control (MAC) address.

6. The method of claim 5, wherein after step (a), the method further comprising
a1) transmitting a packet to the network domain by one of the at least two interconnected computers, wherein the packet comprises a source IP address, a source MAC address, a target IP address, and a target MAC address;
(a2) receiving the packet by the router device and determining whether the packet is provided by a computer connected to the connector for LAN;
(a3) when the packet is provided by the computer connected to the connector for LAN, determining whether the source IP address of the packet corresponds to an address of a computer within the network domain.

7. The method of claim 6, wherein after step (a3), the method further comprises:
(a4) when the source IP address of the packet corresponds to the address of a computer within the network domain, comparing the target IP address of the packet with an IP address of the network address translation unit;
(a5) when the target IP address of the packet corresponds to the IP address of the network address translation unit, determining whether the target IP address is an address of an computer connected to the connector for WAN, the router device altering the target MAC address of the packet as corresponding to the target IP address, altering the source MAC address as being substantially the same with a MAC address of the connector for WAN, and transmitting the packet to the computer connected to the connector for WAN.

8. The method of claim 6, wherein after step (a3), the method further comprises:
(a6) when the source IP address of the packet corresponds to an computer within the network domain, determining whether the target IP address corresponds with an IP address of the connector for LAN;
(a7) the above-mentioned of the internet protocol address is the internet protocol address of the interconnect of the Local Area Network, the router device transfers the protocol of the target medium interview control address to the target protocol address correspondsively, the router device transfers the source protocol medium interview control address to a medium interview control address with the connecter of the Local Area Network, the protocol transfers the connecter of the Local Area Network to the computer of the Local Area Network Internet when the target IP address corresponds with the IP address of the connector for LAN, the router device altering the target MAC address of the packet as corresponding to the target IP address, altering the source MAC address of the packet as being substantially the same with a MAC address of the connector for LAN, and transmitting the packet to the computer connected to the connector for LAN.

* * * * *